United States Patent
Hall et al.

(10) Patent No.: US 9,829,502 B2
(45) Date of Patent: Nov. 28, 2017

(54) MECHANISMS FOR DERIVING AN ACCURATE TIMING SIGNAL FROM A NOISY WAVEFORM

(71) Applicant: Lockheed Martin Corporation, Bethesda, MD (US)

(72) Inventors: Richard M. Hall, Orlando, FL (US); Sreerupa Das, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 632 days.

(21) Appl. No.: 14/285,057

(22) Filed: May 22, 2014

(65) Prior Publication Data
US 2014/0358474 A1    Dec. 4, 2014

Related U.S. Application Data

(60) Provisional application No. 61/828,815, filed on May 30, 2013.

(51) Int. Cl.
*G01P 3/00* (2006.01)
*G01P 3/64* (2006.01)
(Continued)

(52) U.S. Cl.
CPC .............. *G01P 3/64* (2013.01); *G01M 7/025* (2013.01); *G01P 3/48* (2013.01); *G01P 3/489* (2013.01); *G06F 17/142* (2013.01)

(58) Field of Classification Search
None
See application file for complete search history.

(56) References Cited

U.S. PATENT DOCUMENTS 3,408,556 A  10/1968  Gabor
3,662,251 A   5/1972  Smith
(Continued)

FOREIGN PATENT DOCUMENTS

CN   201749124 U    2/2011
EP      2523009 A1  12/2011
JP   2004226164 A    8/2004

OTHER PUBLICATIONS

Li, Hu et al., "Angle Domain Average and CWT for Fault Detection of Gear Crack," Fifth International Conference on Fuzzy Systems and Knowledge Discovery, vol. 3, Oct. 18-20, 2008, IEEE, pp. 137-141.

(Continued)

*Primary Examiner* — David M Gray
*Assistant Examiner* — Geoffrey T Evans
(74) *Attorney, Agent, or Firm* — Withrow & Terranova, PLLC (57) ABSTRACT

Deriving a clean timing signal from a waveform is disclosed. A sensor-of-interest (SOI) sample set and a waveform sample set that correspond to the SOI sample set in time is collected. The waveform sample set is partitioned into a plurality of waveform sample subsets, and the SOI sample set is partitioned into a plurality of SOI sample subsets, each SOI sample subset corresponding to one of the plurality of waveform sample subsets. A plurality of waveform sample subset angular speeds is determined, wherein each waveform sample subset angular speed corresponds to a different waveform sample subset. An aggregate mean angular speed based on the plurality of waveform sample subset angular speeds is determined. Each SOI sample subset is resampled to the aggregate mean angular speed based on the corresponding waveform sample subset angular speed to generate a plurality of resampled SOI subsets.

20 Claims, 8 Drawing Sheets

(51) Int. Cl.
*G06F 17/14* (2006.01)
*G01P 3/48* (2006.01)
*G01P 3/489* (2006.01)
*G01M 7/02* (2006.01)

(56) References Cited

U.S. PATENT DOCUMENTS

| | | | |
|---|---|---|---|
| 3,662,252 A | | 5/1972 | Smith |
| 3,858,109 A | | 12/1974 | Liden |
| 4,450,403 A | * | 5/1984 | Dreiseitl ............... G01P 3/489 324/165 |
| 4,572,999 A | | 2/1986 | Coulon, Jr. |
| 4,584,515 A | | 4/1986 | Edwards |
| 4,912,661 A | | 3/1990 | Potter |
| 4,937,530 A | | 6/1990 | Vogt et al. |
| 5,471,880 A | | 12/1995 | Lang et al. |
| 5,737,216 A | * | 4/1998 | Hokari ............... G01P 3/489 318/685 |
| 5,886,491 A | * | 3/1999 | Yoshida ............... G05B 13/024 318/568.17 |
| 6,215,285 B1 | | 4/2001 | Harmon |
| 6,351,714 B1 | | 2/2002 | Birchmeier |
| 6,530,269 B1 | * | 3/2003 | Colosky ............... G01P 3/489 73/117.02 |
| 7,885,587 B2 | * | 2/2011 | Matsuda ............ G03G 15/5008 399/301 |
| 8,120,824 B2 | * | 2/2012 | Saito ............... H04N 1/506 358/1.1 |
| 2004/0027264 A1 | | 2/2004 | Otte |
| 2004/0186680 A1 | | 9/2004 | Jin et al. |
| 2007/0043528 A1 | * | 2/2007 | Bae ............... G01P 3/48 702/142 |
| 2010/0171457 A1 | | 7/2010 | Letor et al. |
| 2012/0205986 A1 | * | 8/2012 | Frampton ............... H02J 3/381 307/84 |
| 2012/0265387 A1 | * | 10/2012 | Hisada ............... B60K 6/383 701/22 |
| 2014/0267526 A1 | * | 9/2014 | Doshida ............... G03G 15/757 347/116 |

OTHER PUBLICATIONS

Invitation to Pay Additonal Fees and Communication Relating to the Results of the Partial International Search for Patent Application No. PCT/US2014/039157, dated Oct. 2, 2014, 9 pages.

International Preliminary Report on Patentability for International Patent Application No. PCT/US2014/039157, dated Dec. 10, 2015, 16 pages.

International Search Report and Written Opinion for PCT/US2014/039157, dated Dec. 23, 2014, 23 pages.

First Examination Report for Australian Patent Application No. 2014274473, mailed Jul. 10, 2017, 4 pages.

* cited by examiner

MECHANISMS FOR DERIVING AN ACCURATE TIMING SIGNAL FROM A NOISY WAVEFORM

RELATED APPLICATIONS

This application claims the benefit of provisional patent application Ser. No. 61/828,815, filed May 30, 2013, the disclosure of which is hereby incorporated herein by reference in its entirety.

TECHNICAL FIELD

The embodiments relate generally to deriving an accurate timing signal from a waveform, and in particular to deriving an accurate timing signal from a noisy waveform generated by rotating machinery.

BACKGROUND

It is desirable to use vibrational analysis in order to monitor the health of components in vehicles and power plants that use rotating machineries, such as alternators and generators. Vibrational analysis generally requires a tachometer signal as a basis for rotational analysis. However, instrumenting a device with revolution counters, such as tachometers, may be relatively expensive and add additional costs for recertification of the device. Furthermore, mounting a tachometer on a device can also be cumbersome, inconvenient, or impossible.

A voltage waveform from three-phase rotating machinery, such as a motor or alternator, can be used as a tachometer signal if the voltage waveform is relatively clean. However, over time, as the three-phase rotating machinery degrades, the voltage waveform becomes increasingly noisy, inhibiting an ability to derive accurate timing information. Vibrational analysis using vibration signal processing functions requires a signal with accurate timing information.

Noise in a waveform may result in, for example, threshold level crossing glitches, short pulses, multiple threshold crossings, or the like.

SUMMARY

The present embodiments obtain an accurate timing signal from a waveform generated by rotating machinery, such as an alternator or alternating current (AC) generator. In one embodiment, a sensor-of-interest (SOI) sample set and a waveform sample set that corresponds to the SOI sample set in time are received. The SOI sample set may comprise measurements of a desired metric of the alternator, for example. The waveform sample set may define a waveform generated by the alternator, such as a voltage signal generated by a three-phase alternator or by an alternating current (AC) generator. The waveform sample set and the SOI sample set are partitioned into a plurality of waveform sample subsets and a corresponding plurality of SOI sample subsets, respectively. For each waveform sample subset, a corresponding waveform sample subset angular speed is determined. The corresponding waveform sample subset angular speed may be measured, for example, in revolutions per minute (RPM). An aggregate mean angular speed is determined based on the plurality of waveform sample subset angular speeds. Each SOI sample subset may then be resampled to the aggregate mean angular speed based on the waveform sample subset angular speed that corresponds to the respective SOI sample subset.

In one embodiment, the plurality of waveform sample subset angular speeds are determined by first determining a predominant angular speed of the waveform sample set. This may be determined, in one embodiment, based on a Fast Fourier Transform (FFT) function of the waveform sample set. An expected pulse length and an expected pulse length variance based on the predominant angular speed is determined. For each waveform sample subset, a sample subset pulse length is determined based on the expected pulse length and the expected pulse length variance. The corresponding waveform sample subset angular speed for the waveform sample subset is then determined based on the sample subset pulse length that corresponds to the waveform sample subset.

In one embodiment, the plurality of waveform sample subset angular speeds are determined by determining a threshold level crossing detection window, and selecting an upper range value and a lower range value for the threshold level crossing detection window.

In one embodiment, the sample subset pulse length that corresponds to each waveform sample subset based on the expected pulse length and the expected pulse length variance is determined for each waveform sample subset. The sample subset pulse length is determined by processing each waveform sample subset to locate a waveform cycle based on the threshold level crossing detection window, determining a preliminary pulse length of the waveform cycle, determining that the preliminary pulse length is within the expected pulse length variance of the expected pulse length, and setting the sample subset pulse length to the preliminary pulse length.

In one embodiment, the plurality of waveform sample subset angular speeds is determined by determining, for each waveform sample subset, a deviation from the aggregate mean angular speed. Outlier waveform sample subsets are determined by determining if a respective waveform sample subset angular speed is an outlier by determining that the respective waveform sample subset angular speed deviates from the aggregate mean angular speed by more than a predetermined threshold deviation. The outlier waveform sample subsets are removed by replacing the waveform sample subset angular speeds of the outlier waveform sample subsets with an interpolated value derived from immediate neighboring waveform sample subsets.

In one embodiment, a vibration analysis function or other phenomenon related to an angular position of a shaft is used to process the plurality of resampled SOI sample subsets.

In one embodiment, the waveform sample set comprises a voltage waveform or a current waveform from a three-phase alternator, a poly-phase alternator, a three-phase AC generator, or a poly-phase AC generator. In another embodiment, the predetermined time period is less than a time period of a single rotation of the three-phase alternator, the poly-phase alternator, the three-phase AC generator, or the poly-phase AC generator. In another embodiment, the waveform sample set comprises a voltage waveform or a current waveform from a single-phase alternator or a single-phase AC generator. In another embodiment, the predetermined time period is less than a time period of a single rotation of the single-phase alternator or the single-phase AC generator.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first subset" and "second subset," and does not imply a priority, a type, an importance, or other attribute, unless otherwise stated herein.

Condition-based maintenance (CBM) and prognostics and health management (PHM) are increasingly used for determining maintenance of a machine rather than simply relying on time-based or distance-based maintenance schedules, to more closely align the actual need for maintenance with the performance of a maintenance task.

CBM and PHM often rely in part on real-time, or near real-time, data that quantifies one or more sensed conditions of the machine. Machines, such as alternators, alternating current (AC) generators, and the like, that have a rotating member require an accurate timing signal for aligning sensed conditions with the angular position of the rotating member. Tachometers are relatively expensive, and may be cumbersome, impractical, or otherwise undesirable to install for each and every rotating member for which it is desirable to monitor.

It is possible to generate a relatively accurate timing signal from the voltage waveform generated by three-phase rotating machinery. However, as the three-phase rotating machinery degrades over time and/or through use, the voltage waveform becomes increasingly noisy, inhibiting the ability to derive accurate timing information. Vibration signal processing functions require an accurate timing signal. Examples of noisy voltage waveforms, including a threshold level crossing glitch, a short pulse, multiple threshold crossings, and other glitches, are illustrated in the accompanying drawings. Inaccurate timing information results in the smearing of an energy signature across multiple angular locations due to the angular variation of the sample points, and reduces or eliminates the ability to detect problems based on the sensed data.

Accordingly, it would be desirable to synthesize an accurate timing signal from a noisy voltage waveform for vibration signal processing purposes that eliminates the need for a tachometer or other angle position sensor.

Figure 1:
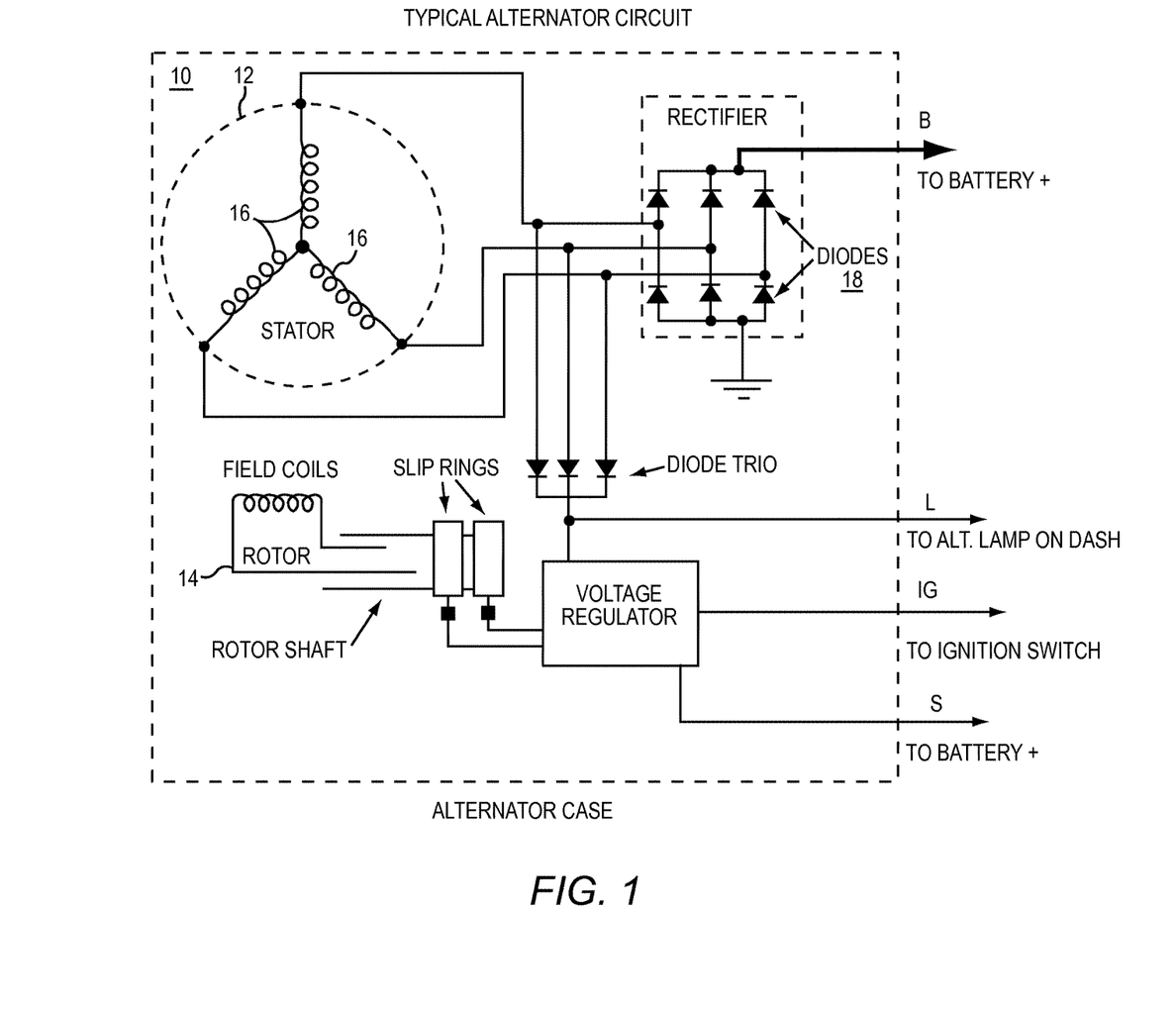
FIG. 1 is a block diagram illustrating an alternator circuit according to one embodiment.

FIG. 1 is a block diagram of an alternator circuit according to one embodiment. The alternator 10 includes a stator 12 and a rotor 14. The rotor 14 is connected to a drive mechanism, such as an alternator pulley (not shown). A drive belt (not shown) spins the alternator pulley, which in turn spins the rotor 14. The stator 12 is mounted inside a body of the alternator 10 and remains stationary.

In this example, the stator 12 contains three sets of looped wires 16 that are evenly distributed to form a three phase system. The rotor 14 contains magnet poles (not shown) that pass close to the looped wires 16. When the rotor 14 spins inside the stator 12, the magnet poles spin past the looped wires 16 in the stator 12 and produce a constantly reversing voltage in the looped wires 16. This produces an AC current in the stator 12. A set of six diodes 18 is used to convert the AC current to direct current (DC). A waveform sensor (not shown) is electrically coupled to the alternator 10 to detect an AC waveform created by the AC current. The waveform sensor can detect an AC voltage waveform or an AC current waveform.

Figure 2A:
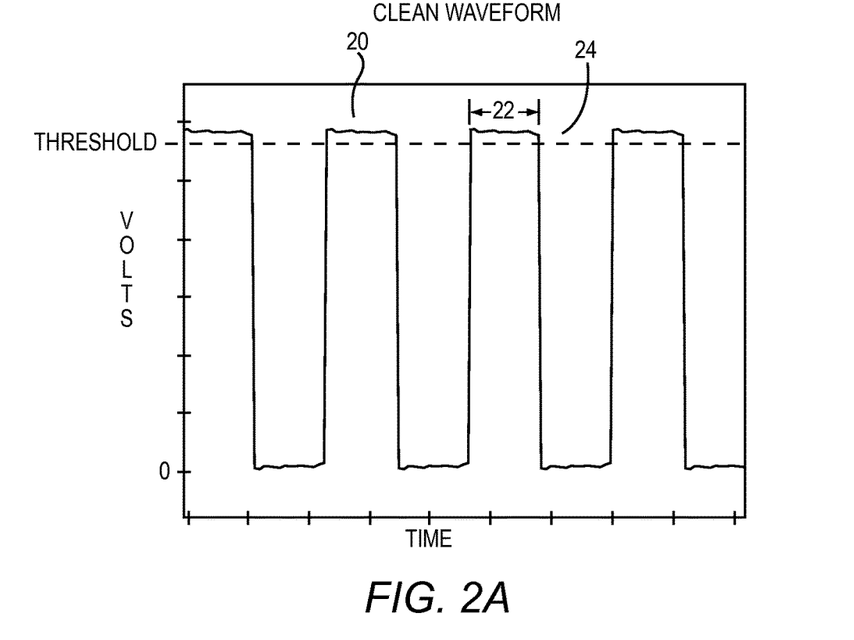
FIGS. 2A-2E illustrate exemplary waveforms from the alternator circuit.

FIG. 2A illustrates a clean AC voltage waveform 20 detected from the alternator 10. The waveform 20 includes a series of pulses having a regular pulse width 22 and a peak magnitude 24. While the alternator 10 generates the clean AC voltage waveform 20, the clean AC voltage waveform 20 can be used as an accurate timing signal for other waveforms being received from another sensor.

Figure 2B:
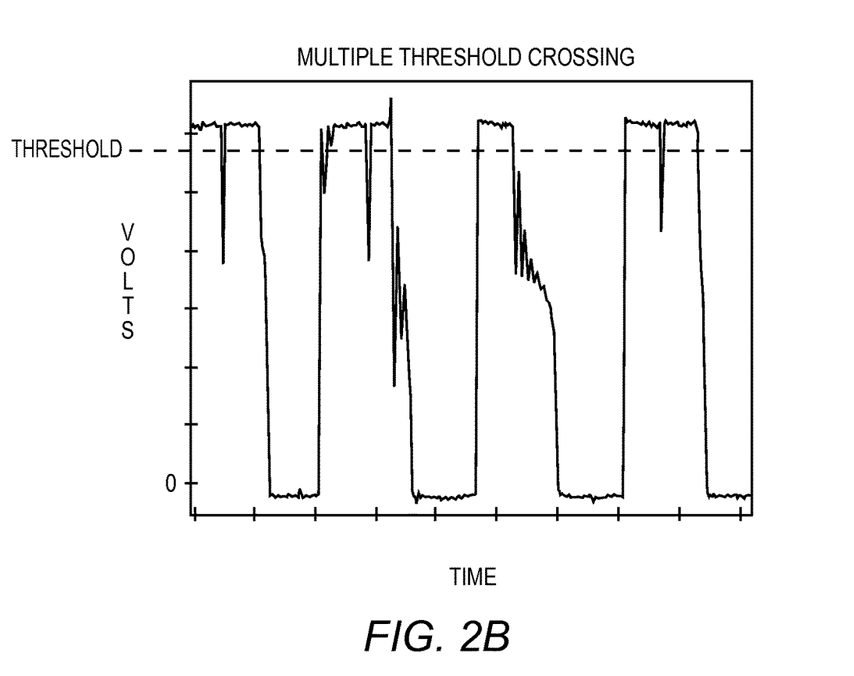
Figure 2C:
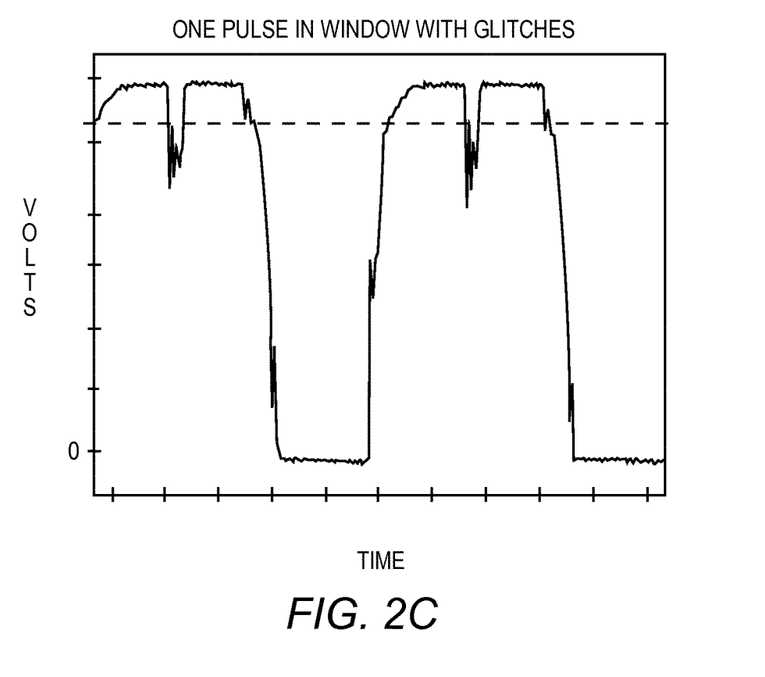
Figure 2D:
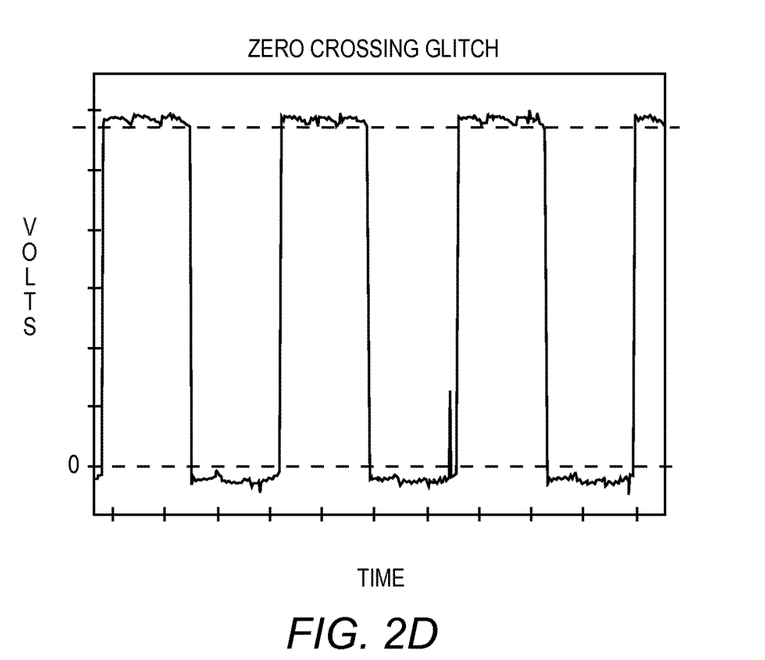
Figure 2E:
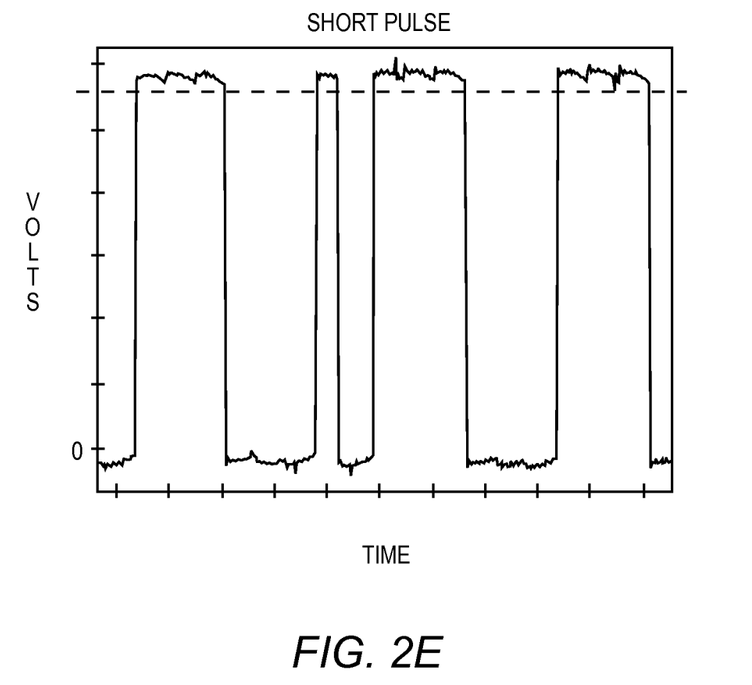

As the alternator circuit ages, the waveform detected from the alternator 10 may become a noisy waveform. The phrase "noisy waveform" refers to a voltage or other electric signal generated by rotating machinery that has a waveform that includes noise. FIGS. 2B-2E illustrate examples of noisy waveforms detected from the alternator 10. FIG. 2B illustrates an example of a waveform having multiple threshold crossings. FIG. 2C illustrates a waveform having one pulse in a detection window and having glitches. FIG. 2D illustrates a waveform having a zero crossing glitch. FIG. 2E illustrates a waveform having a short pulse. In these noisy waveforms, as well as in other noisy waveforms, it is difficult to determine an accurate angular speed for the sample subset.

Figure 3:
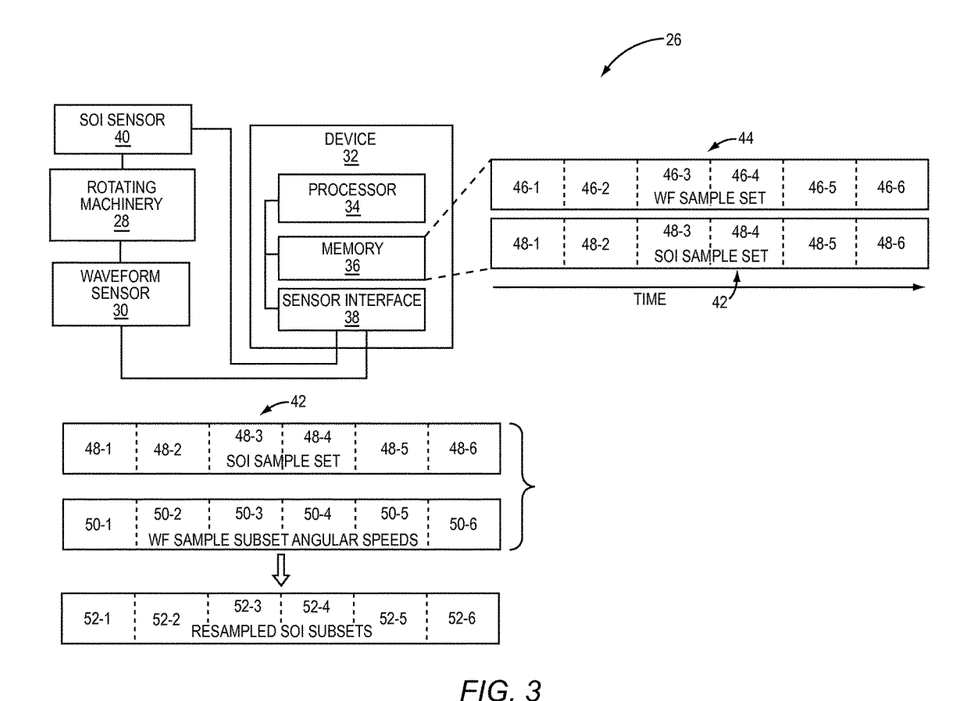
FIG. 3 is a block diagram illustrating a system in which embodiments may be practiced.

FIG. 3 is a block diagram of a system 26 in which embodiments may be practiced. The system 26 includes a rotating machinery 28, such as an alternator or an AC generator. A waveform (WF) sensor 30 is electrically coupled to the rotating machinery 28 and generates sensed data that identifies a voltage waveform generated by the rotating machinery 28. The WF sensor 30 may be electrically coupled to the rotating machinery 28 via existing electrical wiring. The rotating machinery 28 has one or more rotating members. The embodiments have applicability to any member that may directly correlate to the voltage waveform produced by the alternator or AC generator, such as, for example, a rotor of the rotating machinery 28, or any other member that is electrically coupled to the rotor or related to the angular position of the rotor such as field windings, diodes, or such devices.

The rotating machinery 28 may comprise, for example, a device that generates a three-phase voltage signal, although the embodiments may alternatively utilize a single-phase or poly-phase voltage signal. The WF sensor 30 provides the sensed data to a device 32. The device 32 includes a processor 34, a memory 36, and a sensor interface 38.

A sensor-of-interest (SOI) sensor 40 is also coupled to the rotating machinery 28, and generates sensed data that quantifies a sensed condition of the rotating machinery 28. For example, the SOI sensor 40 may comprise a DC output voltage sensor, a DC output current sensor, an accelerometer, or other types of sensors, that may be used, for example, for detecting field winding problems, bearing faults, and the like. While for purposes of illustration only a single SOI sensor 40 is discussed herein, the rotating machinery 28 may be coupled to any number of SOI sensors 40, each of which may generate sensed data that quantifies a different sensed condition of the rotating machinery 28. Although the WF sensor 30 and the SOI sensor 40 are shown as separate sensors, the functions of the WF sensor 30 and the SOI sensor 40 may be carried out by the same sensor.

Figure 4:
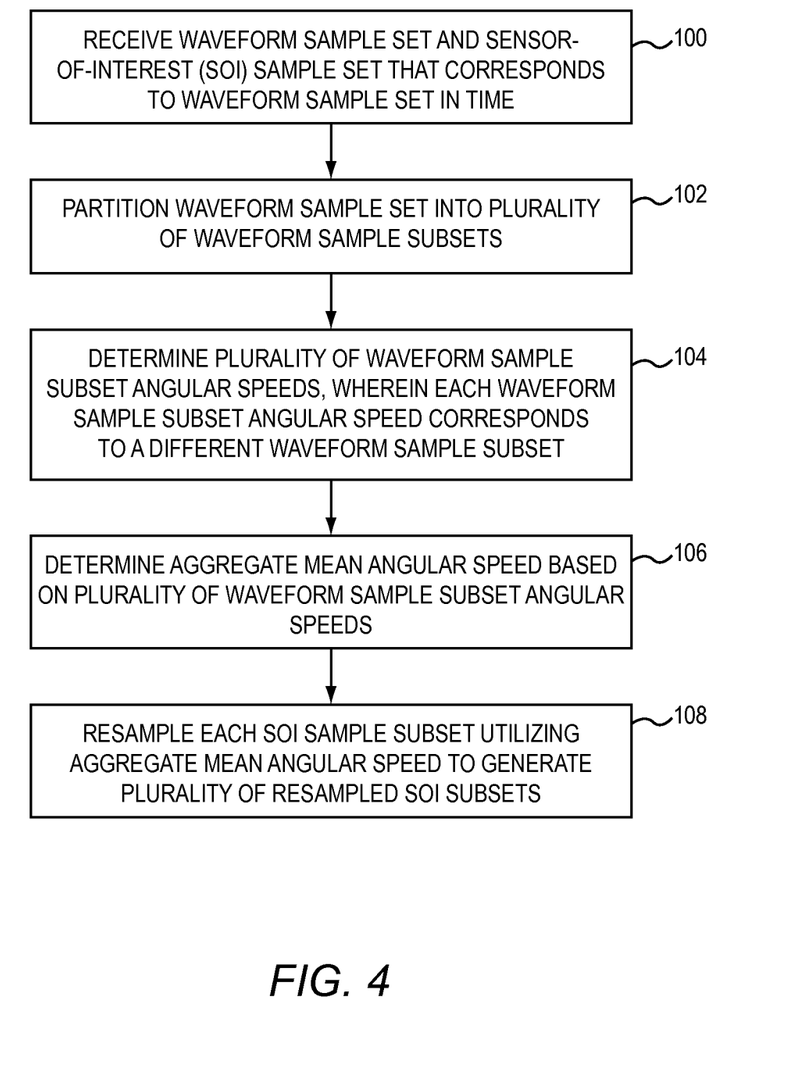
FIG. 4 is a flowchart illustrating a method for generating an accurate timing signal according to one embodiment.

FIG. 4 is a flowchart of a method for generating an accurate timing signal according to one embodiment, and will be discussed in conjunction with FIG. 3. The device 32 receives a SOI sample set 42 of sensed data from the SOI sensor 40, and a WF sample set 44 of sensed data from the WF sensor 30 (FIG. 4, block 100). While for purposes of illustration the WF sensor 30 and the SOI sensor 40 are illustrated as different sensors, in some embodiments a single sensor may be used to derive both the SOI sample set 42 and the WF sample set 44. The SOI sample set 42 and the WF sample set 44 may be retained, for example, in the memory 36, or any other type of electronic storage, and may comprise, for example, the sensed data generated by the SOI sensor 40 and the WF sensor 30, respectively, over a desired duration of time, such as one second. Because the WF sample set 44 comprises a noisy waveform, in the absence of the embodiments disclosed herein, sensor data in the SOI sample set 42 may not be able to be accurately correlated with the angular position of the rotating member(s) of the rotating machinery 28, because the SOI sample set 42 comprises values in the time domain, and requires a precise tachometer signal to be converted into the angle domain for high resolution analysis.

The WF sample set 44 is divided, or otherwise partitioned, into a plurality of WF sample subsets 46-1-46-6 (generally, WF sample subsets 46) (FIG. 4, block 102). Similarly, the SOI sample set 42 is divided, or otherwise partitioned, into a plurality of SOI sample subsets 48-1-48-6 (generally, SOI sample subsets 48). In one embodiment, the WF sample subsets 46 and SOI sample subsets 48 are each of the same time duration, and each WF sample subset 46 corresponds to one SOI sample subset 48.

The device 32 determines a plurality of WF sample subset angular speeds, each WF sample subset angular speed corresponding to one of the WF sample subsets 46 (FIG. 4, block 104). Details for determining WF sample subset angular speeds according to one embodiment will be discussed in conjunction with FIGS. 5A-B. Based on the plurality of WF sample subset angular speeds, an aggregate mean angular speed is determined (FIG. 4, block 106). The SOI sample subsets 48-1-48-6 are then resampled to the aggregate mean angular speed based on corresponding WF sample subset angular speeds 50-1-50-6 (generally, WF sample subset angular speeds 50) to generate resampled SOI subsets 52-1-52-6 (generally, resampled SOI subsets 52). The resampled SOI subsets 52, due to being resampled to the aggregate mean angular speed based on the corresponding WF sample subset angular speeds 50, accurately correlate sensor data in the resampled SOI subsets 52 with angular position of the rotating member of the rotating machinery 28.

Figure 5A:
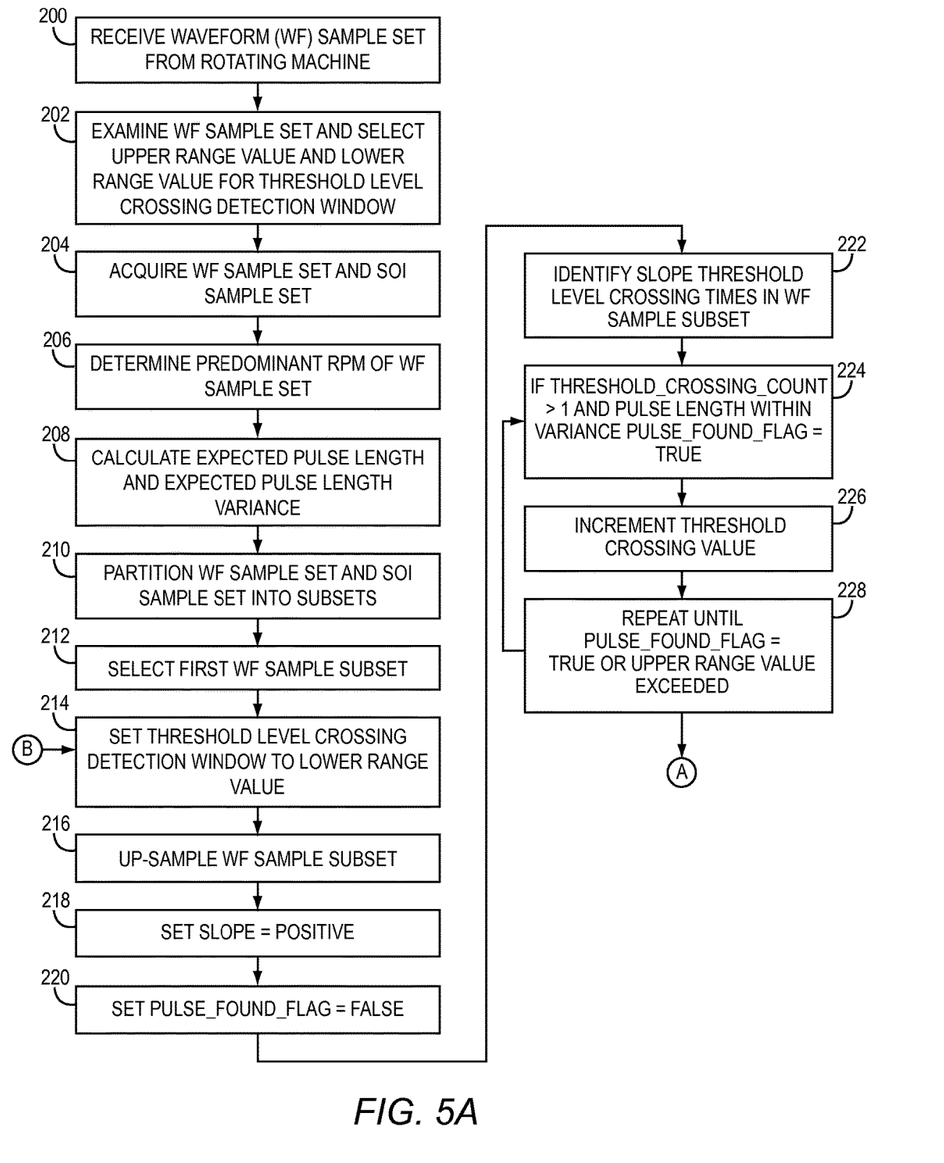
FIGS. 5A and 5B are more detailed flowcharts of the method for generating the accurate timing signal illustrated in FIG. 4 according to one embodiment.
Figure 5B:
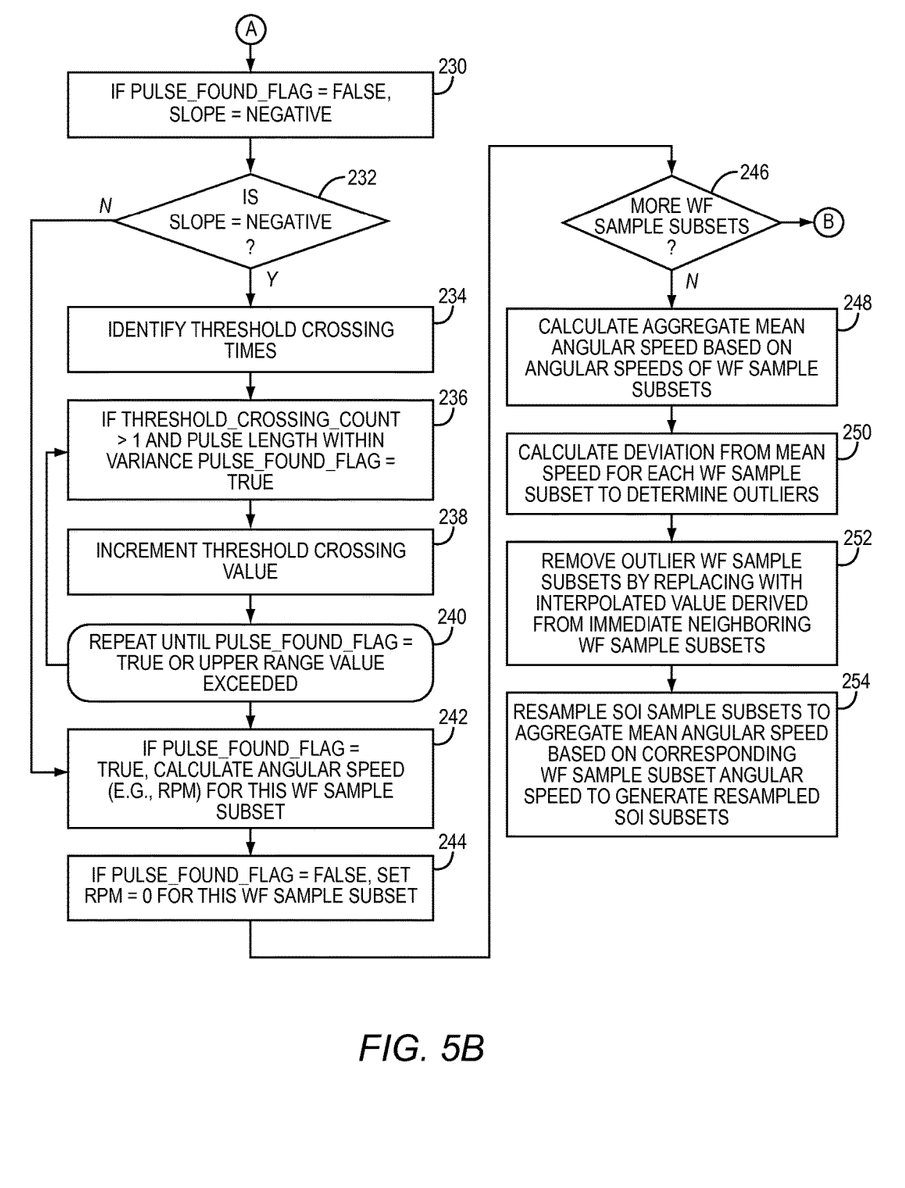

FIGS. 5A-5B illustrate a more detailed flowchart of the method for generating an accurate timing signal illustrated in FIG. 4 according to one embodiment. FIGS. 5A-5B will be discussed in conjunction with FIG. 3. The device 32 may first obtain a WF sample set 44 of the waveform generated by the rotating machinery 28 (FIG. 5A, block 200). The device 32 selects an upper range value and a lower range value for a threshold level crossing detection window based on the WF sample set 44 (FIG. 5A, block 202). The threshold level crossing detection window is used to find, in sample subsets, a pulse, or cycle, of the three-phase waveform. If a clean pulse, or cycle, of the waveform in a sample subset can be found, then an angular speed for the sample subset can be determined. The threshold level crossing detection window may be selected based on attributes of a noisy waveform. For example, it may be determined, based on the noisy waveform, that the "cleanest" portion of the waveform cycle is a cycle that begins somewhere in a range from +7 volts to +12 volts, rather than at 0, due to arbitrary voltage spikes of +6 volts in the noisy waveform.

The device 32 may then acquire the WF sample set 44 and the SOI sample set 42 from the memory 36 (FIG. 5A, block 204). Preferably, the WF sample set 44 and the SOI sample set 42 contain sensed data obtained when the rotating machinery 28 had a relatively stable angular speed, rather than when the rotating machinery 28 was accelerating or decelerating. The size of the WF sample set 44 and the SOI sample set 42 may be based on any desired criterion, such as, for example, the desired resolution. The device 32 determines a predominant angular speed, such as in revolutions per minute (RPM), of the WF sample set 44. In one embodiment, the predominant angular speed (e.g., in RPM) is determined based on a Fast Fourier Transform (FFT) function of the WF sample set 44 (FIG. 5A, block 206).

The device 32 may then determine an expected pulse length and expected pulse length variance based on the predominant angular speed (FIG. 5A, block 208). The WF sample set 44 may then be divided, or otherwise partitioned, into the WF sample subsets 46, and the SOI sample set 42 may then be divided, or otherwise partitioned, into the SOI sample subsets 48 (FIG. 5A, block 210). The WF sample subsets 46 and the SOI sample subsets 48 are each of the same time duration, and each WF sample subset 46 corresponds to one SOI sample subset 48 in time.

The device 32 selects a first WF sample subset 46 and initiates a process, as described in greater detail below, that will be repeated for each WF sample subset 46 to determine a pulse length in the WF sample subset 46 (FIG. 5A, block 212). Initially, the device 32 sets the threshold level crossing detection window to the lower range value determined previously (FIG. 5A, block 214). The device 32 may up-sample the WF sample subset 46 to obtain a higher resolution for waveform analysis (FIG. 5A, block 216). The device 32 sets a variable, SLOPE, to a value of positive (FIG. 5A, block 218). The device 32 sets a variable, PULSE_FOUND_FLAG, to a value of false (FIG. 5A, block 220). The device 32 then analyzes the WF sample subset 46 to identify the slope threshold level crossing times in the WF sample subset 46 (FIG. 5A, block 222). The device sets the PULSE_FOUND_FLAG to true if a THRESHOLD_CROSSING_COUNT is greater than 1 and the pulse length is within the expected pulse length variance (FIG. 5A, block 224). The threshold crossing value is incremented (FIG. 5A, block 226). The device 32 performs blocks 222-228 until either a pulse is found or the upper range value determined previously is exceeded (FIG. 5A, blocks 222-228). The process performed in blocks 222-228 attempts to determine a pulse length based on the leading edge of the waveform in the WF sample subset 46.

If at block 228 the upper range value is exceeded, then no pulse was determined, and the variable PULSE_FOUND_FLAG remains false. If at block 228 the variable PULSE_FOUND_FLAG is true, then a pulse was determined. If neither condition is true, the analysis of the WF sample subset 46 continues at block 224. If either condition is true, processing continues to block 230 (FIG. 5B). If the variable PULSE_FOUND_FLAG is false, then the SLOPE variable is assigned a value of negative (FIG. 5B, block 230). If at block 232 the SLOPE variable has a value of negative, the device 32 analyzes the WF sample subset 46 again, this time based on the trailing edge of the waveform rather than the leading edge of the waveform (FIG. 5B, blocks 234-240).

If a pulse was found in the WF sample subset 46, the angular speed (e.g., in RPMs) is determined for the WF sample subset 46 (FIG. 5B, block 242). If no pulse is found in the WF sample subset 46, the angular speed for the WF sample subset 46 is set to zero (FIG. 5B, block 244).

If additional WF sample subsets 46 are yet to be processed, processing returns to block 214, and the process described above repeats with respect to the next WF sample subset 46 (FIG. 5B, block 246).

After the WF sample subsets 46 are processed, a plurality of angular speeds that corresponds to respective WF sample subsets 46 has been determined (where a pulse could not be found, an angular speed of zero is determined for the respective WF sample subset 46). Based on the plurality of angular speeds of the WF sample subsets 46 that have a non-zero angular speed, an aggregate mean angular speed is determined (FIG. 5B, block 248). A deviation from the mean angular speed for each WF sample subset 46 is determined, and if greater than a threshold value, the angular speed for the respective WF sample subset 46 may be set to zero, or the respective WF sample subset 46 may be otherwise marked as an outlier (FIG. 5B, block 250). The device 32 determines an interpolated angular speed for each outlier WF sample subset 46 based on neighboring WF sample subsets 46 (FIG. 5B, block 252). The device 32 replaces the angular speed for each outlier WF sample subset 46 with the respective interpolated angular speed.

The device 32 may then resample each SOI sample subset 48 to the aggregate mean angular speed based on the corresponding WF sample subset angular speed to generate resampled SOI subsets 52 and accurately align the sensor data in each SOI sample subset 48 with the derived accurate timing signal (FIG. 5B, block 254).

For example, a SOI sample set 42 having data points at one-tenth of a second intervals is partitioned into a SOI sample subset 48-1, a SOI sample subset 48-2, and a SOI sample subset 48-3. A WF sample set 44 is received from rotating machinery 28. The WF sample set 44 is partitioned into a WF sample subset 46-1, a WF sample subset 46-2, and a WF sample subset 46-3. The angular speed for the WF sample subset 46-1 is determined to be 3100 RPM. The angular speed for the WF sample subset 46-2 is determined to be 2875 RPM. The angular speed for the WF sample subset 46-3 is determined to be 3025 RPM. The aggregate mean angular speed is determined to be 3000 RPM for the WF sample set 44.

The SOI sample subset 48-1 is resampled using the 3000 RPM aggregate mean angular speed. Because the angular speed for the WF sample subset 46-1 was 3100 RPM, the SOI sample subset 48-1 will have too many data points. During the resampling, the data points are recalculated based on the aggregate mean angular speed, and the number of data points is reduced to 500.

Similarly, the SOI sample subset 48-2 is resampled using the 3000 RPM aggregate mean angular speed. Because the angular speed for the WF sample subset 46-2 was 2875 RPM, the SOI sample subset 48-2 will have too few data points. During the resampling, the data points are recalculated based on the aggregate mean angular speed, and the number of data points is increased to 500.

Finally, the SOI sample subset 48-3 is resampled using the 3000 RPM aggregate mean angular speed. Because the angular speed for the WF sample subset 46-3 was 3025 RPM, the SOI sample subset 48-3 will have too many data points. During the resampling, the data points are recalculated based on the aggregate mean angular speed and the number of data points is reduced to 500. It should be noted that the order of resampling the SOI sample subsets 48 is not important.

Those skilled in the art will recognize improvements and modifications to the embodiments of the disclosure. All such improvements and modifications are considered within the scope of the concepts disclosed herein and the claims that follow.

What is claimed is:

1. A method for deriving a timing signal from a waveform generated by a rotating machinery, comprising:
    receiving, by a processor, a waveform sample set of a voltage waveform or current waveform from a rotating machinery and a sensor-of-interest (SOI) sample set that corresponds to the waveform sample set in time, the SOI sample set quantifying a sensed condition of the rotating machinery, wherein the waveform sample set comprises the voltage waveform or the current waveform from a three-phase alternator, a poly-phase alternator, a three-phase alternating current (AC) generator, a poly-phase AC generator, a single-phase alternator, or a single-phase AC generator;
    partitioning the waveform sample set into a plurality of waveform sample subsets, wherein each of the plurality of waveform sample subsets has a predetermined time period;
    determining a plurality of waveform sample subset angular speeds, wherein each waveform sample subset angular speed corresponds to a different waveform sample subset;
    determining an aggregate mean angular speed based on the plurality of waveform sample subset angular speeds; and
    resampling the SOI sample set utilizing the aggregate mean angular speed to generate a resampled SOI sample set.

2. The method of claim 1, wherein determining the plurality of waveform sample subset angular speeds further comprises:
    determining a predominant angular speed of the waveform sample set;
    for each waveform sample subset, determining an expected pulse length and an expected pulse length variance based on the predominant angular speed;
    for each waveform sample subset, determining a waveform sample subset pulse length that corresponds to each waveform sample subset based on the expected pulse length and the expected pulse length variance; and for each waveform sample subset, determining the waveform sample subset angular speed based on the sample subset pulse length that corresponds to each waveform sample subset.

3. The method of claim 2, wherein determining the plurality of waveform sample subset angular speeds further comprises:
determining a threshold level crossing detection window; and
selecting an upper range value and a lower range value for the threshold level crossing detection window.

4. The method of claim 3, wherein determining a sample subset pulse length that corresponds to each waveform sample subset based on the expected pulse length and the expected pulse length variance further comprises for each waveform sample subset:
processing each waveform sample subset to locate a waveform cycle based on the threshold level crossing detection window, and determining a preliminary pulse length of the waveform cycle;
determining that the preliminary pulse length is within the expected pulse length variance of the expected pulse length; and
setting the sample subset pulse length to the preliminary pulse length.

5. The method of claim 2, wherein determining the plurality of waveform sample subset angular speeds further comprises:
determining, for each waveform sample subset, a deviation from the aggregate mean angular speed;
determining outlier waveform sample subsets by determining if a respective waveform sample subset angular speed is an outlier by determining that the respective waveform sample subset angular speed deviates from the aggregate mean angular speed by more than a predetermined threshold deviation;
removing the outlier waveform sample subsets by replacing the waveform sample subset angular speeds of the outlier waveform sample subsets with an interpolated value derived from immediate neighboring waveform sample subsets.

6. The method of claim 2, wherein determining the predominant angular speed of the waveform sample set further comprises determining the predominant angular speed of the waveform sample set based on a Fast Fourier Transform (FFT) function of the waveform sample set.

7. The method of claim 1, wherein resampling the SOI sample set comprises:
partitioning the SOI sample set into a plurality of SOI sample subsets, wherein each SOI sample subset corresponds to one of the waveform sample subset angular speeds; and
resampling each SOI sample subset at the corresponding waveform sample subset angular speed to generate a plurality of resampled SOI sample subsets.

8. The method of claim 7, further comprising:
processing, by a vibration analysis function or other phenomenon related to an angular position of a shaft, the plurality of resampled SOI sample subsets.

9. The method of claim 1, wherein the predetermined time period is less than a time period of a single rotation of the three-phase alternator, the poly-phase alternator, the three-phase AC generator, or the poly-phase AC generator.

10. The method of claim 1, wherein the predetermined time period is less than a time period of a single rotation of the single-phase alternator or the single-phase AC generator.

11. A device for deriving a timing signal from a waveform generated by a rotating machinery, comprising:
a sensor interface configured to receive sensor data; and
a processor coupled to the sensor interface and configured to:
receive a waveform sample set of a voltage waveform or current waveform from a rotating machinery and a sensor-of-interest (SOI) sample set that corresponds to the waveform sample set in time, the SOI sample set quantifying a sensed condition of the rotating machinery, wherein the waveform sample set comprises the voltage waveform or the current waveform from a three-phase alternator, a poly-phase alternator, a three-phase alternating current (AC) generator, a poly-phase AC generator, a single-phase alternator, or a single-phase AC generator;
partition the waveform sample set into a plurality of waveform sample subsets, wherein each of the plurality of waveform sample subsets has a predetermined time period;
determine a plurality of waveform sample subset angular speeds, wherein each waveform sample subset angular speed corresponds to a different waveform sample subset;
determine an aggregate mean angular speed based on the plurality of waveform sample subset angular speeds; and
resample the SOI sample set utilizing the aggregate mean angular speed to generate a resampled SOI sample set.

12. The device of claim 11, wherein to determine the plurality of waveform sample subset angular speeds, the processor is further configured to:
determine a predominant angular speed of the waveform sample set;
for each waveform sample subset, determine an expected pulse length and an expected pulse length variance based on the predominant angular speed;
for each waveform sample subset, determine a sample subset pulse length that corresponds to each waveform sample subset based on the expected pulse length and the expected pulse length variance; and
for each waveform sample subset, determine the waveform sample subset angular speed based on the sample subset pulse length that corresponds to each waveform sample subset.

13. The device of claim 12, wherein to determine the plurality of waveform sample subset angular speeds, the processor is further configured to:
determine a threshold level crossing detection window; and
select an upper range value and a lower range value for the threshold level crossing detection window.

14. The device of claim 13, wherein to determine a sample subset pulse length that corresponds to each waveform sample subset based on the expected pulse length and the expected pulse length variance, for each waveform sample subset, the processor is further configured to:
process each waveform sample subset to locate a waveform cycle based on the threshold level crossing detection window, and determine a preliminary pulse length of the waveform cycle;
determine that the preliminary pulse length is within the expected pulse length variance of the expected pulse length; and
set the sample subset pulse length to the preliminary pulse length.

15. The device of claim 12, wherein to determine the plurality of waveform sample subset angular speeds, the processor is further configured to:
   determine, for each waveform sample subset, a deviation from the aggregate mean angular speed;
   determine outlier waveform sample subsets by determining if a respective waveform sample subset angular speed is an outlier by determining that the respective waveform sample subset angular speed deviates from the aggregate mean angular speed by more than a predetermined threshold deviation;
   remove the outlier waveform sample subsets by replacing the waveform sample subset angular speeds of the outlier waveform sample subsets with an interpolated value derived from immediate neighboring waveform sample subsets.

16. The device of claim 12, wherein to determine the predominant angular speed of the waveform sample set, the processor is further configured to determine the predominant angular speed of the waveform sample set based on a Fast Fourier Transform (FFT) function of the waveform sample set.

17. The device of claim 11, wherein resampling the SOI sample set comprises:
   partitioning the SOI sample set into a plurality of SOI sample subsets, wherein each SOI sample subset corresponds to one of the waveform sample subset angular speeds; and
   resampling each SOI sample subset at the corresponding waveform sample subset angular speed to generate a plurality of resampled SOI sample subsets.

18. The device of claim 17, wherein the processor is further configured to:
   process, by a vibration analysis function or other phenomenon related to an angular position of a shaft, the plurality of resampled SOI sample subsets.

19. The device of claim 11, wherein the predetermined time period is less than a time period of a single rotation of the three-phase alternator, the poly-phase alternator, the three-phase AC generator, or the poly-phase AC generator.

20. The device of claim 11, wherein the predetermined time period is less than a time period of a single rotation of the single-phase alternator or the single-phase AC generator.

* * * * *